(12) United States Patent
Ingram et al.

(10) Patent No.: US 10,951,809 B2
(45) Date of Patent: Mar. 16, 2021

(54) ADAPTIVE CAMERA CONTROL AND CALIBRATION FOR DYNAMIC FOCUS

(71) Applicant: The Boeing Company, Chicago, IL (US)

(72) Inventors: Luke Charles Ingram, Summerville, SC (US); Anthony W. Baker, Gilbertsville, PA (US); Brandon Michael Courter, Mount Pleasant, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/155,503

(22) Filed: Oct. 9, 2018

(65) Prior Publication Data

US 2020/0112684 A1  Apr. 9, 2020

(51) Int. Cl.
  *H04N 5/232* (2006.01)
  *H04N 13/282* (2018.01)
  *H04N 13/246* (2018.01)
  *H04N 13/296* (2018.01)

(52) U.S. Cl.
  CPC ..... *H04N 5/232121* (2018.08); *H04N 13/246* (2018.05); *H04N 13/282* (2018.05); *H04N 13/296* (2018.05)

(58) Field of Classification Search
  None
  See application file for complete search history.

(56) References Cited

U.S. PATENT DOCUMENTS

| 10,096,114 | B1* | 10/2018 | Lasenby | H04N 17/002 |
| 2004/0264763 | A1* | 12/2004 | Mas | G06K 9/00664 |
| | | | | 382/154 |
| 2008/0291318 | A1* | 11/2008 | Artonne | H04N 5/2254 |
| | | | | 348/340 |
| 2010/0194860 | A1* | 8/2010 | Mentz | H04N 5/2252 |
| | | | | 348/47 |

(Continued)

OTHER PUBLICATIONS

Camera Calibration and 3D Reconstruction; OpenCV; available at https://docs.opencv.org/2.4/modules/calib3d/doc/camera_calibration_and_3d_reconstruction.html; 47 pages.

*Primary Examiner* — Kate H Luo
(74) *Attorney, Agent, or Firm* — Miller, Matthias & Hull LLP

(57) ABSTRACT

A camera vision system for creating 3D reconstructions of objects may include a camera, a distance sensor having a fixed spatial relationship with the camera, and a system controller. The system controller receives distance sensor signals from the distance sensor indicating a sensor-to-object distance, determines a camera-to-object distance and a corresponding camera focus state based on the sensor-to-object distance, and transmits camera focus state control signals to cause the camera to adjust to the camera focus state. The system controller retrieves camera intrinsic parameter values for the camera focus state, transmits image capture control signals to cause the camera to capture an object image of the object, receives object image data from the camera for the captured object image, and stores the object image data and the camera intrinsic parameter values in an image database for use in the 3D reconstruction.

9 Claims, 4 Drawing Sheets

(56) References Cited

U.S. PATENT DOCUMENTS

| | | | | |
|---|---|---|---|---|
| 2013/0124471 A1* | 5/2013 | Chen | ............... | H04N 5/247 |
| | | | | 707/624 |
| 2014/0268361 A1* | 9/2014 | Nunnink | ............... | G02B 3/14 |
| | | | | 359/665 |
| 2014/0362253 A1* | 12/2014 | Kim | ............... | G06T 7/70 |
| | | | | 348/231.4 |
| 2015/0124055 A1* | 5/2015 | Kotake | ............... | G01B 11/2513 |
| | | | | 348/46 |
| 2015/0346471 A1* | 12/2015 | Schwarz | ............... | H04N 7/181 |
| | | | | 348/80 |
| 2016/0189358 A1* | 6/2016 | Boufarguine | ............... | G06T 7/80 |
| | | | | 348/50 |
| 2017/0155830 A1* | 6/2017 | Chien | ............... | H04N 5/2254 |
| 2017/0184704 A1* | 6/2017 | Yang | ............... | H04N 5/2257 |
| 2017/0257555 A1* | 9/2017 | Li | ............... | H04N 5/23212 |
| 2019/0011557 A1* | 1/2019 | Weber | ............... | H04N 5/23212 |
| 2019/0098179 A1* | 3/2019 | Hung | ............... | G03B 17/08 |
| 2019/0188432 A1* | 6/2019 | Lozano | ............... | G06K 7/10386 |

* cited by examiner

ADAPTIVE CAMERA CONTROL AND CALIBRATION FOR DYNAMIC FOCUS

TECHNICAL FIELD

The present disclosure relates generally to camera visions system and, more particularly, to dynamic camera focusing and retrieval of intrinsic camera calibration parameters based on a sensed distance from the camera to an object.

BACKGROUND

Camera vision systems, such as stereo vision systems and structured light, are used throughout various industries to reconstruct three-dimensional (3D) scans of objects for various purposes. For high resolution 3D reconstruction, intrinsic camera calibration parameters, including focal length and distortion coefficients, must be known at pixel-level accuracy for a given focus state of a camera in order to generate an accurate and detailed reconstructed image of an object. Changes in the focus state of the camera (manual focus changes or dynamic focusing) are often required to take quality high resolution imagery in situations in which the distance from the camera to the object varies. The intrinsic parameters to be used for reconstructing captured images of the object into the 3D image are dependent on the focus state of the camera, so the correct intrinsic parameters must be selected when the focus state changes.

SUMMARY OF THE DISCLOSURE

In one aspect of the present disclosure, a camera vision system for creating a 3D reconstruction of an object. The camera vision system may include a camera having a camera controller, a distance sensor having a fixed spatial relationship with the camera, and a system controller operatively connected to the camera controller and the distance sensor. The system controller may be programmed to receive distance sensor signals from the distance sensor, wherein the distance sensor signals indicate a sensor-to-object distance from the distance sensor to the object, determine a camera-to-object distance from the camera to the object and a corresponding camera focus state for the camera-to-object distance based on the sensor-to-object distance, and transmit camera focus state control signals to the camera controller to cause the camera controller to adjust the camera to the camera focus state. The system controller may further be programmed to retrieve camera intrinsic parameter values for the camera that correspond to the camera focus state, transmit image capture control signals to the camera controller to cause the camera to capture an object image of the object, receive object image data from the camera controller corresponding to the object image captured by the camera, and store the object image data and the camera intrinsic parameter values in an image database.

In another aspect of the present disclosure, a method of dynamically focusing a camera and capturing images and generating 3D reconstructions of objects. The method may include determining a first camera-to-object distance from the camera to an object, causing a camera controller of the camera to adjust a camera focus state of the camera to a first camera focus state that corresponds to the first camera-to-object distance, retrieving first camera intrinsic parameter values of the camera that correspond to the first camera focus state, commanding the camera controller to cause the camera to capture a first image of the object, and storing first image data of the first image and the first camera intrinsic parameter values.

In a further aspect of the present disclosure, a method for performing intrinsic calibration in a camera vision system. The method may include adjusting a camera of the camera vision system to a camera focus state, capturing an image of a target object, determining intrinsic parameter values for the camera at the camera focus state from captured target image data for the image of the target object, and storing the camera focus state and the intrinsic parameter values for the camera at the camera focus state in an intrinsic parameter database.

Additional aspects are defined by the claims of this patent.

DETAILED DESCRIPTION

Camera vision systems in accordance with the present disclosure provide an adaptive intrinsic calibration method to support dynamic focus of the camera system for acquisition of image data to be used in 3D reconstruction of an imaged object. In an exemplary embodiment, the camera vision system includes one or more cameras and a corresponding depth or distance sensor mounted on a mobile structure such as a pan-tilt unit. As the cameras pan and/or tilt, the distance from the camera to the target object change so that the depth of field is no longer centered about the target object without updating the focus of the camera. The distance sensor senses the distance to the object, and the system determines a new focus state for the camera corresponding to the sensed distance and adjusts the focus of the cameras accordingly. As a focus changes, intrinsic parameters of the cameras for the new focus states are retrieved for use in converting captured image data to a 3D representation of the object. This arrangement can improve the speed and quality of the 3D reconstruction of the object over previous systems.

Figure 1:
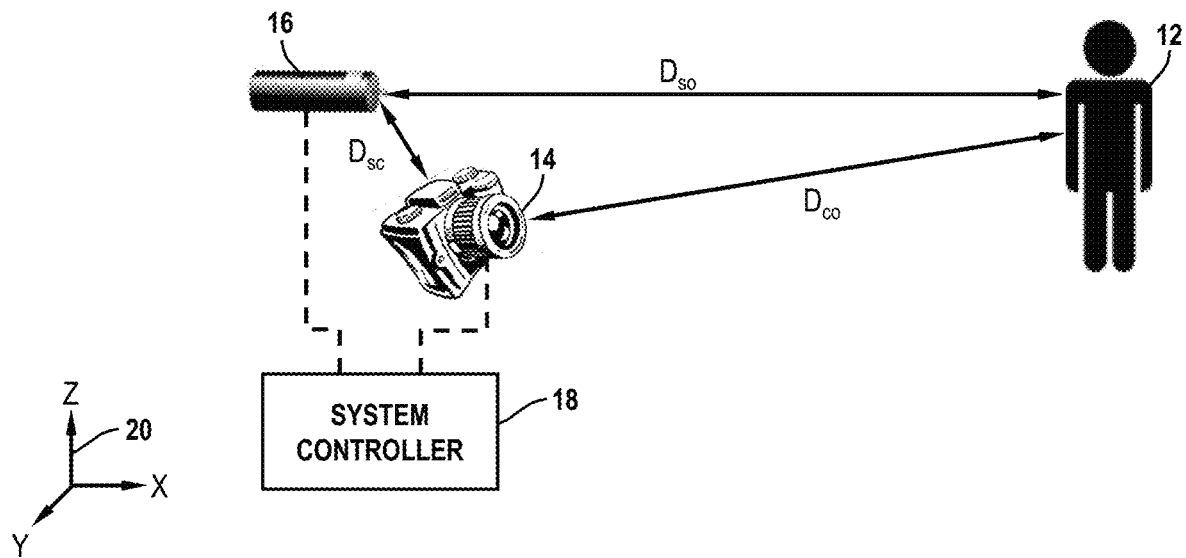
FIG. 1 is a schematic illustration of components of a camera vision system in accordance with the present disclosure.

Referring to FIG. 1, an exemplary camera vision system 10 is illustrated that is capable of capturing images of an object 12 and creating a 3D reconstruction of the object 12 from the captured images. The camera vision system 10 may include a camera 14, a distance sensor 16 and a system controller 18 operatively connected to the camera 14 and to the distance sensor 16 for exchanging information that will control the operation of the camera 14 to capture images of the object 12. In the camera vision system 10, the camera 14 and the distance sensor 16 have a fixed spatial relationship within a three-dimensional coordinate system 20 so that a sensor-to-camera distance Dsc remains constant. Additionally, a relative orientation between the camera 14 and the distance sensor 16 remains constant within the coordinate system 20 as the camera 14 and the distance sensor 16 move around the object 12 to capture multiple images of the object 12 from different angles. To maintain the fixed spatial relationship, the camera 14 and the distance sensor 16 may be mounted to a common structure (not shown) such as a pan-tilt unit, an articulating arm, a tripod or other support structure that can move or be moved around the object 12 in two or three dimensions.

Figure 2:
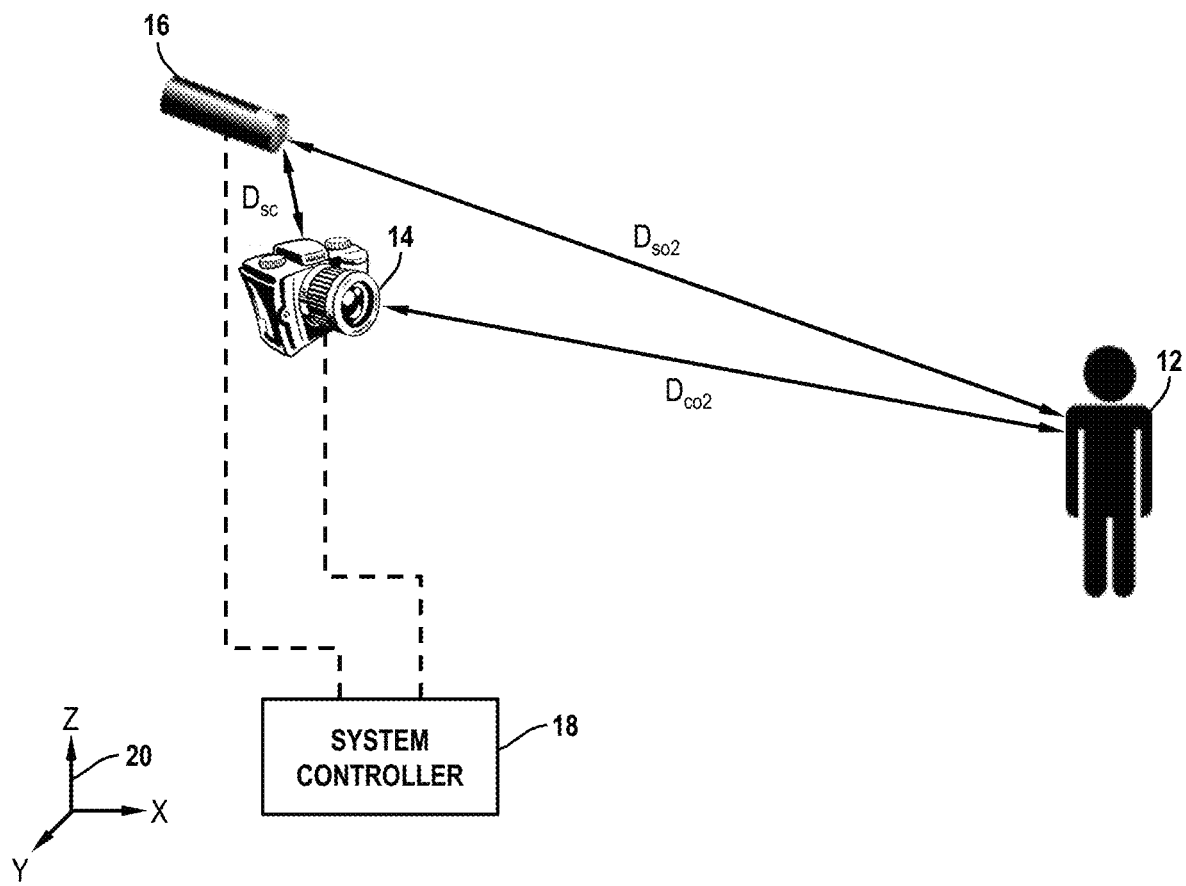
FIG. 2 is a schematic illustration of the camera vision system of FIG. 1 with a camera and a distance sensor moved to a second position relative to an object.

In the position of the camera vision system 10 shown in FIG. 1, the camera 14 is positioned at a first camera-to-object distance Dco from the object 12. At the same time, the distance sensor 16 is positioned at a sensor-to-object distance Dso. With the camera 14 and the distance sensor 16 having the fixed spatial relationship within the coordinate system 20, the camera-to-object distance Dco can be calculated based on the known sensor-to-object distance Dso using standard geometric calculations. In some embodiments, the conversion from the sensor-to-object distance Dso to the corresponding camera-to-object distance Dco and camera focus state may be pre-calculated and stored in a lookup table at the system controller 18, and are retrieved when the sensor-to-object distance Dso is detected. Once determined, the system controller 18 transmits control signals to the camera 14 to shift its focus to the new focus state. As long as the camera 14 and the distance sensor 16 remain at the same distances Dco, Dso, respectively, from the object 12, the camera 14 maintains its focus state. In FIG. 2, the camera 14 and the distance sensor 16 have articulated to a new position relative to the object 12. The camera 14 and the distance sensor 16 have translated and rotated within the coordinate system 20, but the sensor-to-camera distance Dsc remains constant due to their fixed spatial relationship. Distance sensor signals from the distance sensor 16 indicate to the system controller 18 that the distance sensor 16 is at a second sensor-to-object distance Dso2 from the object 12. Upon detecting the change, the system controller 18 determines a corresponding second camera-to-object distance Dco2 and a second focus state for the camera 14. The system controller 18 then transmits camera focus control signals to the camera 14 to shift its focus to the second focus state.

Figure 3:
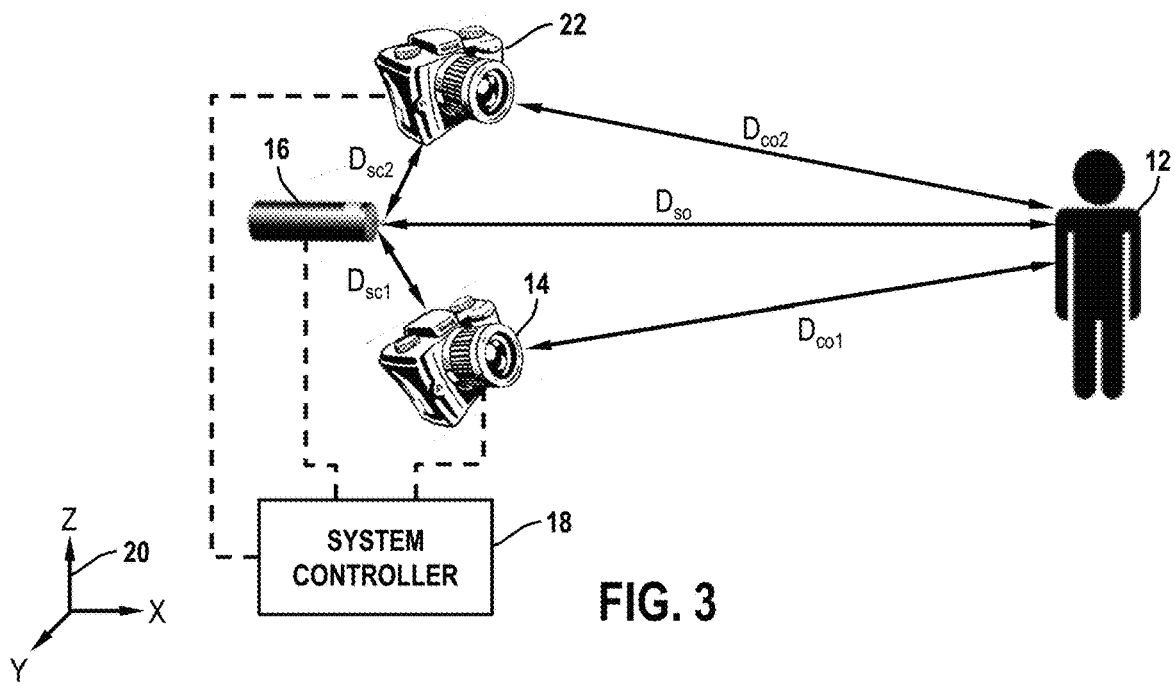
FIG. 3 is a schematic illustration of the camera vision system of FIG. 1 with a second camera.

In some embodiments, the camera vision system 10 may include multiple cameras that move together to capture multiple images of the object 12 for use in the 3D reconstruction the object 12. Referring to FIG. 3, the camera vision system 10 includes a second camera 22 having a fixed spatial relationship with the first camera 14 and the distance sensor 16. The second camera 22 is a second sensor-to-camera distance Dsc2 from the distance sensor 16, and the system controller 18 is configured to determine a second camera-to-object distance Dc2o from the second camera 22 along with the first camera-to-object distance Dc1o of the first camera 14. The system controller 18 also determines a focus state for the second camera 22 and transmits camera focus control signals to the second camera 22 to cause the second camera 22 to adjust to the focus state for capturing images of the object 12.

To convert the images of the object 12 into a reconstructed 3-D image, certain intrinsic parameters of the cameras 14, 22 are required for an accurate conversion. Such intrinsic properties can include the focal length of the camera, the location of the principal point on the camera's focal plane, tangential and radial distortion coefficients and the like. Values for the intrinsic parameters can be calculated for each camera or model of camera using known techniques for intrinsic calibration. An example of intrinsic calibrations and 3-D reconstruction techniques can be found at https://docs.opencv.org/2.4/modules/calib3d/doc/camera_calibration_and_3d_reconstruction.html. Such techniques may include focusing on and capturing images of an object having a known geometry, such as a chessboard, and determining if and how much the captured image is distorted relative to the geometry of the reference object.

For a given camera, each focus or focus state of the camera has a unique set of values of the intrinsic parameters. Therefore, to achieve an accurate and well-defined 3D reconstruction of an object, intrinsic parameter values for a range of focus states may be determined and stored for later use. The range of focus states may extend from a maximum focus state to a minimum focus state, and include focus states at regular intervals between the minimum and maximum focus states. At each focus state within the range, the camera may be set to the corresponding focus, and intrinsic parameter values may be calculated using traditional intrinsic calibration techniques such as those described above. The focus states and corresponding intrinsic parameter values may be used to populate an intrinsic parameter database for the camera. With the intrinsic parameter database populated, the deviation between the intrinsic parameter values for successive focus states may be assessed. If the difference is too great to construct sufficiently well-defined 3D images, the focus state interval may be reduced and intrinsic parameter values may be determined for additional focus states until the intrinsic parameter value deviations are within tolerance to construct well-defined 3D images.

In the camera vision system 10 in accordance with the present disclosure, the distance from the distance sensor 16 and the determined intrinsic parameter values for the focus states can be used in a dynamic intrinsic process to create well-defined 3D reconstructions of the object 12. The distance sensor 16 provides the sensor-to-object distance Dso to the system controller 18 that in turn determines the appropriate focus state. The system controller 18 transmits control signals to the camera 14 to cause the camera 14 to adjust the focus state. The system controller 18 also retrieves the corresponding intrinsic parameter values for the focus state from the intrinsic parameter database. If the calculated focus state is between focus states stored in the intrinsic parameter database, the system controller 18 may interpolate the stored intrinsic parameter values to generate intrinsic parameter values for the calculated focus state. Captured image data from the camera 14 is combined with the retrieve and/or interpolated intrinsic parameter values for use in the 3D reconstruction of the object 12. Embodiments of the dynamic intrinsic process are illustrated and described in greater detail below.

Figure 4:
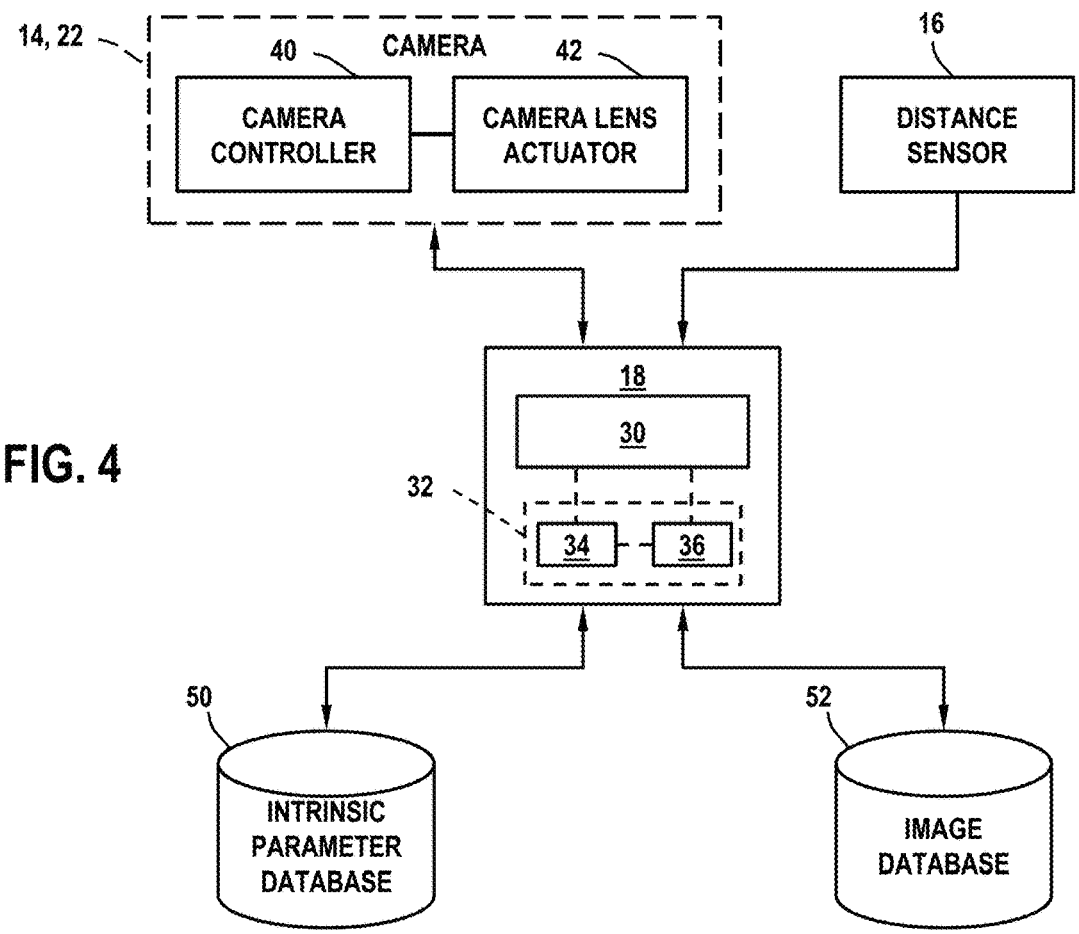
FIG. 4 is a block diagram of control components that may implement image capture and 3D reconstruction in accordance with the present disclosure in the camera vision system of FIG. 1.

FIG. 4 illustrates an embodiment of electrical and electromechanical control elements of the camera vision system 10. The system controller 18 may be capable of processing information received from the cameras 14, 22, the distance sensor 16 and other monitoring and control devices using software stored at the system controller 18, and outputting command and control signals to the cameras 14, 22 and other devices of the camera vision system 10. The system controller 18 may include a processor 30 for executing a specified program, which controls and monitors various functions associated with the camera vision system 10. The processor 30 may be operatively connected to a memory 32 that may have a read only memory (ROM) 34 for storing programs, and a random access memory (RAM) 36 serving as a working memory area for use in executing a program stored in the ROM 34. Although the processor 30 is shown, it is also possible and contemplated to use other electronic components such as a microcontroller, an application specific integrated circuit (ASIC) chip, or any other integrated circuit device.

The cameras 14, 22 are operatively connected to the system controller 18. The cameras 14, 22 may be any appropriate camera configured for capturing high-resolution images and having lens and focus control that can be integrated into the camera vision system 10 in accordance with the present disclosure. As illustrated, each camera 14, 22 has intelligence provided by a camera controller 40 that may be of a type such as those discussed above for the system controller 18. The camera controller 40 is configured to exchange control signals and data with the system controller 18. For example, the system controller 18 may transmit focus and image capture control signals, and the camera controller 40 may transmit image data for captured images of the objects 12. The camera controller 40 may be programmed to automatically focus the camera 14, 22 in the absence of focus control signals from the system controller 18 using auto-focusing techniques known in the art. Software for such techniques may be stored in a camera memory (not shown) and accessed by the camera controller 40.

The illustrated cameras 14, 22 further include camera lens actuators 42 operatively coupled to the camera controller 40. The camera lens actuator 42 may be operatively connected to a lens (not shown) of the camera 14, 22 and actuatable to move the lens and adjust the focus state of the camera 14, 22. The camera lens actuator 42 and the connection to the lens may be any appropriate electro-mechanical mechanism configured to convert movement of the camera lens actuator 42 into movement of the camera lens. In one embodiment, the camera lens actuator 42 comprises a rotary encoder wherein each discrete encoder position corresponds to a focus state of the camera 14, 22. When a focus state is determined by the system controller 18, the focus state may be converted to the corresponding encoder position value, and the camera lens actuator 42 is controlled to actuate and rotate to the encoder position. The use of cameras 14, 22 having other types of camera lens actuators 42 in the camera vision system 10 is contemplated by the inventors.

The distance sensor 16 of the camera vision system 10 is operatively connected to the system controller 18 to provide distance sensor signals indicative of the sensor-to-object distance Dso to the sensed object 12. The distance sensor 16 may be any appropriate sensor capable of detecting an object and sensing a distance to the object. Exemplary distance sensor 16 may include point-source lasers, optical sensors, radar sensors, sonic sensors, ultrasonic sensors and the like. The particular distance sensor 16 implemented in the camera vision system 10 may have a resolution necessary to accurately determine a focus state for the cameras 14, 22 and retrieve/interpolate the corresponding intrinsic parameter values.

As part of or in addition to the memory 32 of the system controller 18, databases may be used to store information necessary for image capture and 3D reconstruction in the camera vision system 10. An intrinsic parameter database 50 may be provided to store the focus state and corresponding intrinsic parameter values determined during the intrinsic calibration of the cameras 14, 22. The intrinsic parameter database 50 may be populated during the intrinsic calibration, and later accessed during image capture and/or 3D reconstruction. The camera vision system 10 may further include an image database 52 that stores two-dimensional (2D) image data captured by the cameras 14, 22 as images of the object 12 are captured. Along with the image data, the image database 52 may store the corresponding focus state at which each captured image was taken. The focus state can then be used to retrieve/interpolate the corresponding intrinsic parameter values from the intrinsic parameter database 50. In alternative embodiments, the intrinsic parameter values may also be stored with the image data if doing so facilitates the 3D reconstruction of the object 12 and reduces duplicate processing steps.

FIG. 4 illustrates one embodiment of the components of the camera vision system 10, but alternative embodiments are contemplated by the inventors. For example, the processing of the controllers 18, 40 can be combined at the system controller 18, with the system controller 18 controlling the camera lens actuators 42 directly. In other embodiments, the distance sensor 16 may be operatively connected to each camera controller 40, and with the camera controls 40 being programmed to convert the sensor-to-object distance Dso to the corresponding camera-to-object distances Dco. In other embodiments, intrinsic parameter values may be stored for each individual camera 14, 22 of the camera vision system 10. Alternatively, the camera vision system 10 may store a single set of intrinsic parameter values for each model of camera used in the camera vision system 10 so long as there are not significant variations in the intrinsic calibrations of the same model cameras. The intrinsic parameter database 50 and the image database 52 may be stored at the same memory structure, such as the memory 32 of the system controller 18, or may be stored in different memory structures that are each connected to and accessed by the system controller 18 during intrinsic calibration of the cameras 14, 22 and image capture and 3D reconstruction of the object 12. Further alternative configurations of the components of the camera vision system 10 will be apparent to those skilled in the art and are contemplated by the inventors as having use in camera vision systems 10 and image capture and 3D reconstruction routines in accordance with the present disclosure.

INDUSTRIAL APPLICABILITY

Figure 5:
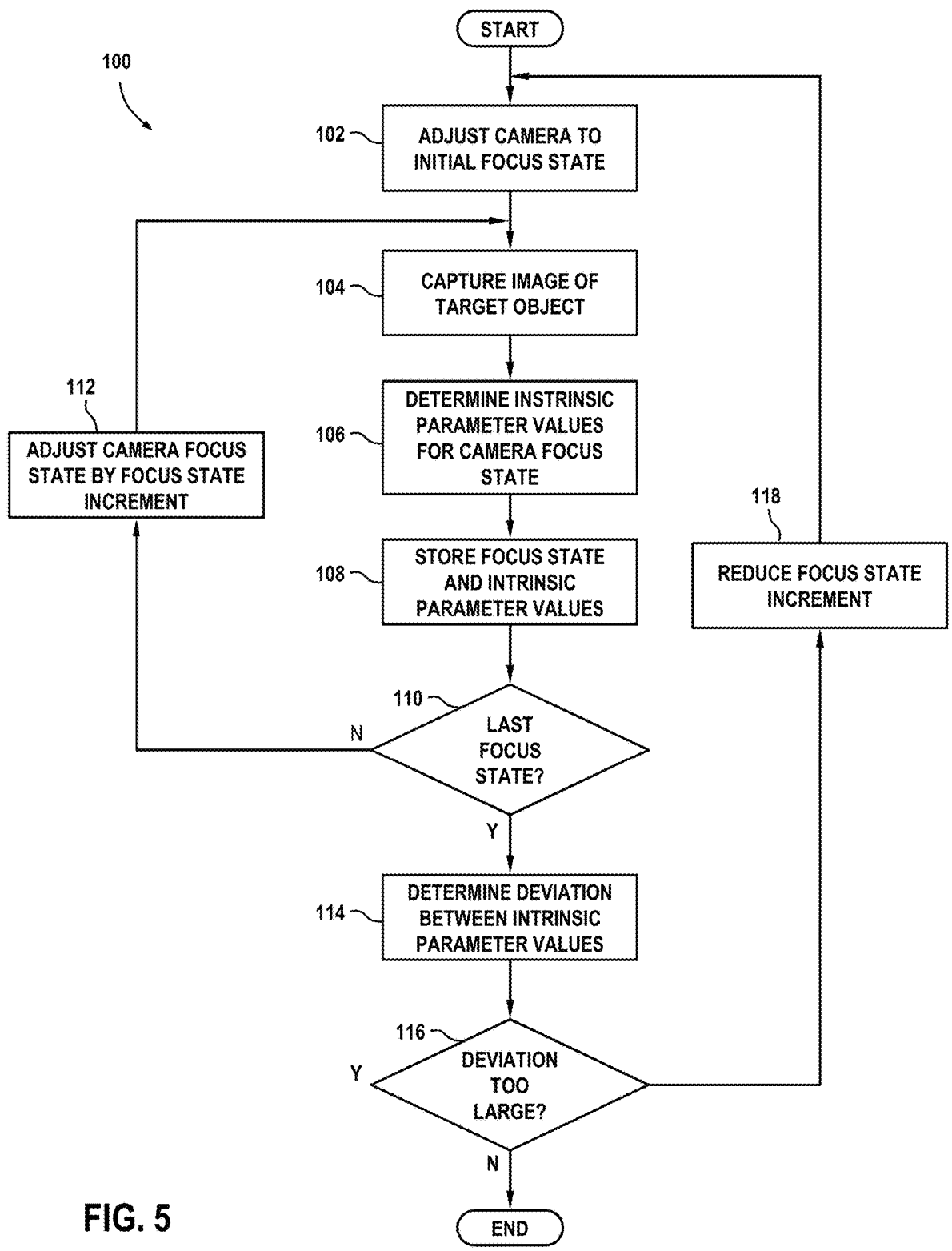
FIG. 5 is a flow diagram of an exemplary camera vision system intrinsic calibration routine in accordance with the present disclosure.

FIG. 5 illustrates a flow diagram of an exemplary camera vision system intrinsic calibration routine 100 in accordance with the present disclosure. The intrinsic calibration routine 100 may begin at a block 102 where the camera 14, 22 to be calibrated is adjusted to an initial focus state of a focus state range of values. The focus state range of values may reflect a range of distances at which the cameras 14, 22 may be positioned relative to the object 12. For example, the cameras 14, 22 may have potential distances to the object 12 ranging from a minimum of two feet to a maximum of thirty feet from the object 12. To start the intrinsic calibration routine 100, the camera may be adjusted to focus two feet from the camera 14, 22. In subsequent iterations as discussed further below, the focus state may be adjusted by specified focus state increments up to the maximum focus state.

After the camera 14, 22 is set to the initial focus state at the block 102, control may pass to a block 104 where the camera 14, 22 captures an image of a target object. The target object may have a known geometry, such as a chessboard so that distortions in the captured image from the known geometry of the target object may be identified and quantified. The image capture by the camera 14, 22 may be controlled by the system controller 18, the corresponding camera controller 40, or other controller that is managing the process of the intrinsic calibration routine 100. After the image is captured at the block 104, control may pass to a block 106 where the system controller 18, the camera controller 40 or other controller determines the values of the intrinsic parameters for the current focus state of the camera 14, 22. Intrinsic parameter values may be determined using any known techniques for intrinsic calibration of a camera, such as those described above. After determining the intrinsic parameter values at the block 106, control may pass to a block 108 where the current focus state and the intrinsic parameter values for the current focus state are stored in a storage structure such as the intrinsic parameter database 50.

The intrinsic calibration routine 100 continues by acquiring intrinsic parameter values at a plurality of intermediate focus states between the minimum focus state and the maximum focus state. The intermediate focus states may occur at predetermined focus state increments until the last or maximum focus state is calibrated. In the present example, the focus states of the camera 14, 22 may be increased at six inch increments from the two foot minimum focus state up to the thirty foot maximum focus state. Consequently, after the intrinsic parameter values are stored at the block 108 for the two foot focus state, control may pass to a block 110 where the controller executing the intrinsic calibration routine 100 may determine if the last focus state of the focus state range has been calibrated. If the last focus state has not been calibrated, such as after only the minimum focus state has been calibrated, control may pass to a block 112 where the focus state of the camera 14, 22 is adjusted by the focus state increment. In the example, the camera 14, 22 is adjusted from the two foot focus state to the 2.5 foot state. After the camera 14, 22 is adjusted to the new focus state, control passes back to the blocks 104-108 to capture an image of the target object, and determine and store the intrinsic parameter values for the new focus state.

If it is determined that the last focus state has been calibrated at the block 110, such as when the thirty foot focus state has been calibrated, control may pass to a block 114 to determine the deviations between the intrinsic parameter values for adjacent focus states. In a simple implementation, the deviations between the intrinsic parameter values of the focus states may be determined by subtraction to find the difference between the intrinsic parameter values. In other implementations, more complex mathematical and statistical methods may be implemented to determine deviations between the intrinsic parameter values. Deviations in the intrinsic parameter values that are too large or greater than a specified tolerance may result in 3D reconstructions having poor quality and poor definition, and may require calibration of additional intermediate focus states to improve the quality of the 3D reconstruction of the object 12.

After the deviations in the intrinsic parameter values are determined at the block 114, control passes to a block 116 where the controller determines whether the deviations are too large to produce quality images. If the deviations are not too large, the intrinsic calibration of the camera 14, 22 may be sufficient to produce high-quality 3D reconstructions of the objects 12. In this case, the intrinsic parameter database 50 may be sufficiently populated and the intrinsic calibration routine 100 may terminate.

If the deviations are too large, additional focus states at smaller increments between the ends of the focus state range may be taken to reduce the deviations between the intrinsic parameter values of adjacent focus states. When the deviations are too large, control may pass to a block 118 where the focus state increment may be reduced by an appropriate amount so that focus states between previously calibrated focus states will be calibrated and stored in the intrinsic parameter database 50. For example, the six-inch focus state increment in the present example may be reduced to a three-inch increment to double the density of focus states that are calibrated by the intrinsic calibration routine 100. After the focus state increment is adjusted at the block 118, control may pass back to the block 102 to readjust the camera 14, 22 to the initial focus state and cycle through the focus state range to calibrate the additional focus states. In some embodiments, the intrinsic calibration routine 100 may be configured to skip focus states that have already been calibrated in previous iterations of the intrinsic calibration routine 100 in order to reduce the time and processing resources required to fully calibrate the camera 14, 22. The iterative process of the intrinsic calibration routine 100 will continue until the deviation in the intrinsic parameter values is within acceptable tolerances at the block 116. The intrinsic calibration routine 100 may be repeated for each of the cameras used in the camera vision system 10. If the precision of manufacturing the cameras 14, 22 of a particular camera model is high and the intrinsic parameter values will not vary substantially from camera 14, 22 to camera 14, 22, it may be sufficient to calibrate one exemplary camera 14, 22 of that model and store the calibrated intrinsic parameter values for use with the image data captured by a camera 14, 22 of that model in the 3D reconstruction process.

Figure 6:
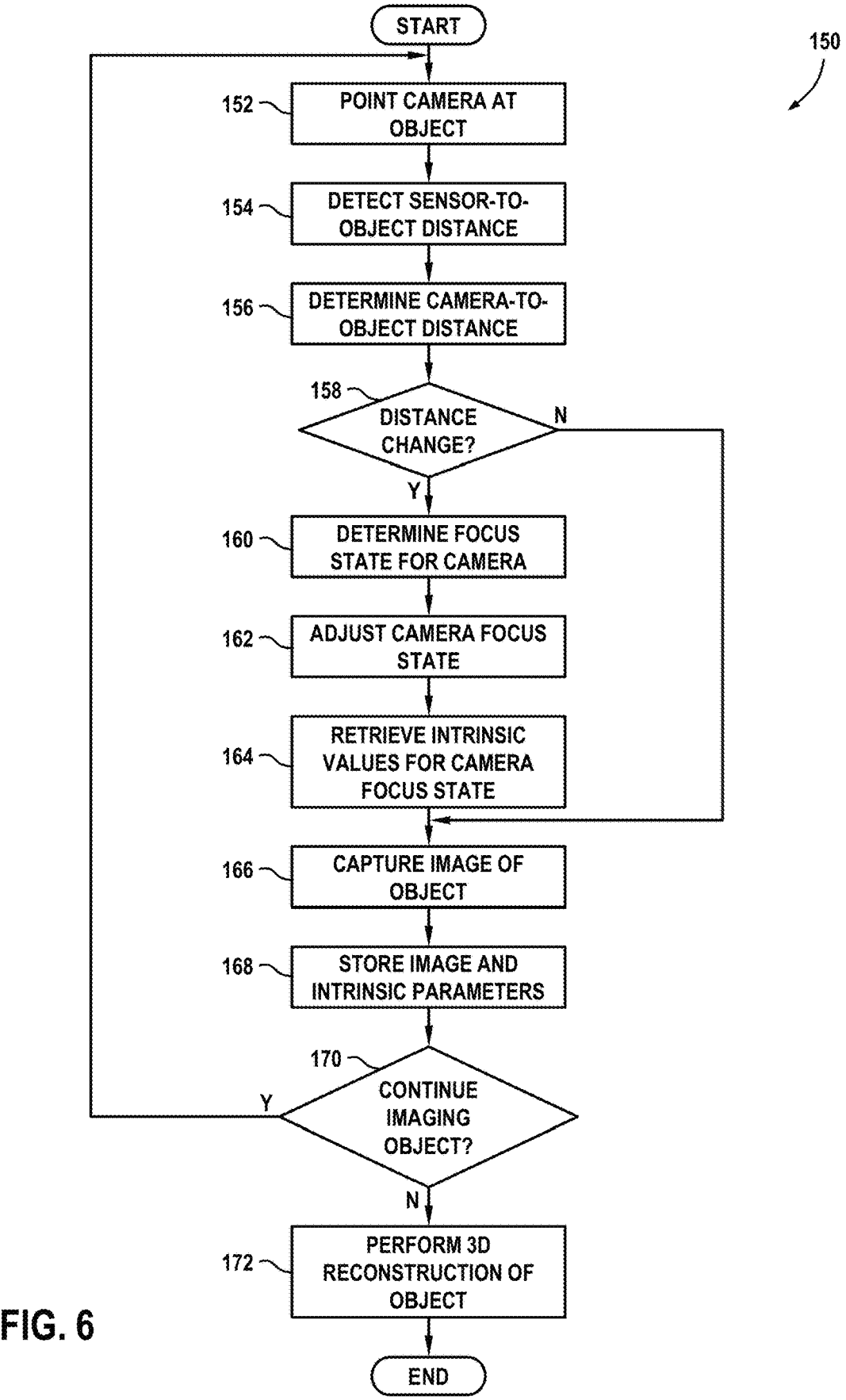
FIG. 6 is a flow diagram of an exemplary image capture and 3D reconstruction routine in accordance with the present disclosure.

Once the cameras 14, 22 of the camera vision system 10 have been calibrated, the camera vision system 10 may be used to capture images of the object 12 that may then be converted into a 3D reconstruction of the object 12. FIG. 6 illustrates an embodiment of a flow diagram of an exemplary image capture and 3D reconstruction routine 150 in accordance with the present disclosure. The routine 150 may begin at a block 152 where the camera or cameras 14, 22 of the camera vision system 10 are pointed at the object 12 to be imaged. As discussed above, the cameras 14, 22 may be mounted to a common structure such as a pan-tilt unit that can move or be moved around the object 12 in two or three dimensions. The structure may be manually movable by an operator or technician to position the cameras 14, 22 at various locations necessary to capture images for an accurate 3D representation of the object 12. Alternatively, movement of the structure and the cameras 14, 22 mounted thereon may be automated and controlled by a control structure such as the system controller 18 to move the cameras 14, 22 to various image capture locations about the object 12.

Once the cameras 14, 22 are positioned and pointed at the object 12, control may pass to a block 154 where the distance sensor 16 senses the sensor-to-object distance Dso at the current position. The distance sensor 16 senses the sensor-to-object distance Dso and transmits distance sensor signals having values corresponding to the sensor-to-object distance Dso to the system controller 18. In response to receiving the distance sensor signals from the distance sensor 16 at the system controller 18, control may pass to a block 156 where the system controller 18 determines the camera-to-object distances Dco based on the sensor-to-object distance Dso in the distance sensor signals. The camera-to-object distances Dco may be calculated in any appropriate manner as described above.

If the camera-to-object distance Dco has not changed since last determined at the block 156, the focus state of the cameras 14, 22 has not changed and it may not be necessary to refocus the cameras 14, 22 and retrieve intrinsic parameter values for the focus state. Consequently, if the camera-to-object distance Dco has not changed at the block 158, control of the routine 150 may bypass camera focusing and intrinsic parameter value retrieval steps, and instead proceed to capturing an image of the object 12. However, if the camera-to-object distance Dco has changed at the block 158, control may pass to a block 160 where the system controller 18 may determine the focus state for the cameras 14, 22 corresponding to the sensor-to-object distance Dso and the camera-to-object distances Dco, and to a block 162 to cause the cameras 14, 22 to be adjusted to the new focus state. In one embodiment, the system controller 18 may transmit camera control signals to the camera controller 40 containing values corresponding to the focus state. The camera controller 40 may receive the camera control signals, and convert the focus state information to camera lens actuator control signals that are transmitted to the camera lens actuator 42. The camera lens actuator control signals will cause the camera lens actuator 42 to actuate and move the lens of the camera 14, 22 to the position corresponding to the new focus state. In alternative embodiments, the system controller 18 may format and transmit the camera lens actuator control signals to the camera lens actuator 42 directly.

After the camera focus state is adjusted at the block 162, control may pass to a block 164 where the system controller 18 may retrieve intrinsic parameter values corresponding to the camera focus state from the intrinsic parameter database 50. The intrinsic parameter values will be needed during the 3D reconstruction process to accurately convert images of the object 12 taken by the camera 14, 22 at the current camera focus state. If the camera focus state matches a stored camera focus state, the corresponding intrinsic parameter values may be used in the subsequent steps of the routine 150. In other instances, the camera focus state determined from the distances Dso, Dco may fall between camera focus states stored in the intrinsic parameter database 50. In such cases, the system controller 18 may be programmed to retrieve and interpolate the intrinsic parameter values for relevant stored camera focus states to generate intrinsic parameter values that more closely correspond to the current camera focus state of the camera 14, 22.

With the camera 14, 22 adjusted to the camera focus state and the corresponding intrinsic parameter values retrieved and/or interpolated from the intrinsic parameter database 50, either during the present iteration or during a previous iteration of the routine 150, control may pass to a block 166 where an image of the object 12 may be captured by the cameras 14, 22 at the current camera focus state. Depending on the configuration of the camera vision system 10, the system controller 18 may transmit image capture control signals to the camera controller 40 to cause the camera 14, 22 to snap an image of the object 12. After the image of the object 12 is captured by the camera 14, 22, the camera controller 40 may transmit object image data for the captured image back to the system controller 18. When the object image data is received at the system controller 18, control may pass to a block 168 where the object image data and the intrinsic parameter values for the camera focus state are stored in the image database 52 for later use during the 3D reconstruction of the object 12.

After the object image data and the intrinsic parameter values are stored in the image database 52, the system controller 18 may determine whether the routine 150 is to continue capturing images of the object 12. In an automated image capture process, the system controller 18 may be programmed with a sequence of locations in which to position the camera 14, 22 to capture a sufficient number of images of the object 12 to generate a high-quality 3D reconstruction of the object 12. If the system controller 18 determines that images of the object 12 have not been captured at each of the locations in the sequence at a block 170, control may pass back to the block 152 to reposition the camera 14, 28 at the next location and point the camera at the object 12. In a manual or partially manual implementation of the image capture process, an operator or technician may enter coordinates corresponding to the next location at which the camera 14, 22 will capture an image of the object 12, thereby causing control the pass back to the block 152. Other implementations of the routine 150 are contemplated where the determination step at the block 170 may occur automatically, semi-automatically or manually so that the routine 150 will continue until the camera 14, 22 has been positioned at all the required locations for the 3D reconstruction process and has captured images of the object 12 at those locations. Once it is determined that no more images of the object 12 will be captured at the block 170, control may pass to a block 172 where the 3D reconstruction of the object 12 is performed utilizing any appropriate reconstruction technique as discussed above utilizing the object image data and corresponding intrinsic parameter values stored in the image database 52.

Traditional camera intrinsic calibration methods and image capture do not incorporate dynamic focusing of camera lenses as distances between cameras and target objects change. Camera vision systems 10 in accordance with the present disclosure provide and external distance sensor 16 that provides object distance information that is used to control the adjustment of cameras 14, 22 to appropriate focus states for capturing images of the target object 12, and to retrieve the applicable intrinsic parameter values for focus state of the camera 14, 22 so that accurate, high quality 3D reconstructions of the target object 12 can be generated. Adjusting the camera focus state based on the sensor-to-object distance Dso provided by the distance sensor 16 may yield a fast, efficient and accurate auto-focusing response in the cameras 14, 22. Moreover, converting from the sensor-to-object distance Dso to the corresponding camera focus state and retrieving the corresponding stored intrinsic parameter values for the camera focus state can improve the speed and accuracy of the process for reconstructing 3D images of the target object 12, and improve the quality of the images. In implementations where the quality of the 3D reconstruction may be crucial, such as where the 3D representations of the object 12 are part of an inspection process, the inspection time may be reduce by increasing the accuracy and quality of the 3D reconstructed image reviewed by the inspectors.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A camera vision system for creating a three-dimensional (3D) reconstruction of an object comprising:
   a camera having a camera controller;
   a distance sensor having a fixed spatial relationship with the camera;
   an intrinsic parameter database storing a plurality of camera focus states and corresponding camera intrinsic parameter values for each of the plurality of camera focus states, wherein the camera intrinsic parameter values are information used in converting captured image data of the object to the 3D reconstruction of the object; and
   a system controller operatively connected to the camera controller, the distance sensor and the intrinsic parameter database, the system controller being programmed to:
      receive distance sensor signals from the distance sensor, wherein the distance sensor signals indicate a sensor-to-object distance from the distance sensor to the object,
      determine a camera-to-object distance from the camera to the object and a corresponding camera focus state for the camera-to-object distance based on the sensor-to-object distance,
      transmit camera focus state control signals to the camera controller to cause the camera controller to adjust the camera to the camera focus state,
      retrieve camera intrinsic parameter values for the camera that correspond to the camera focus state from the intrinsic parameter database,
      transmit image capture control signals to the camera controller to cause the camera to capture an object image of the object,
      receive object image data from the camera controller corresponding to the object image captured by the camera,
      store the object image data and at least one of the corresponding focus state at which the image data was captured and the corresponding camera intrinsic parameter values for the corresponding focus state in an image database; and
      perform a 3D reconstruction of the object from stored object image data and the camera intrinsic parameter values for the corresponding focus states for the object image data stored in the image database.

2. The camera vision system of claim 1, wherein the camera comprises a camera lens actuator operatively connected to the camera controller, wherein the system controller is programmed to convert the camera-to-object distance to a camera lens actuator position corresponding to the camera focus state, and wherein the camera focus state control signals include the camera lens actuator position.

3. The camera vision system of claim 1, wherein the system controller is programmed to:
   detect a change of the sensor-to-object distance to a second sensor-to-object distance from the distance sensor to the object based on the distance sensor signals; and
   determine a second camera-to-object distance from the camera to the object and a corresponding second camera-to-object focus state for the second camera-to-object distance based on the second sensor-to-object distance.

4. The camera vision system of claim 1, comprising a second camera having a second camera controller, wherein the second camera has a second fixed spatial relationship with the distance sensor, wherein the system controller and the intrinsic parameter database are operatively connected to the second camera controller, and wherein the system controller is programmed to:
   determine a second camera-to-object distance from the second camera to the object and a corresponding second camera focus state for the second camera-to-object distance based on the sensor-to-object distance,
   transmit second camera focus state control signals to the second camera controller to cause the second camera controller to adjust the second camera to the second camera focus state,
   retrieve second camera intrinsic parameter values for the second camera that correspond to the second camera focus state from the intrinsic parameter database,
   transmit image capture control signals to the second camera controller to cause the second camera to capture a second object image of the object,
   receive second object image data from the second camera controller corresponding to the second object image captured by the second camera,
   store the second object image data and at least one of the corresponding second camera focus state at which the image data was captured and the corresponding second camera intrinsic parameter values for the corresponding focus state in the image database; and
   perform a 3D reconstruction of the object from stored second object image data and the second camera intrinsic parameter values for the corresponding focus states for the second object image data stored in the image database.

5. A method of dynamically focusing a camera and capturing images and generating three-dimensional (3D) reconstructions of objects, comprising:
   determining a first camera-to-object distance from the camera to an object;
   causing a camera controller of the camera to adjust a camera focus state of the camera to a first camera focus state that corresponds to the first camera-to-object distance;
   retrieving first camera intrinsic parameter values of the camera that correspond to the first camera focus state from an intrinsic parameter database that stores a plurality of camera focus states and corresponding intrinsic parameter values of the camera for each of the plurality of camera focus states;
   commanding the camera controller to cause the camera to capture a first image of the object;
   storing a first image data of the first image and at least one of the corresponding focus state at which the first image data was captured and the corresponding first camera intrinsic parameter values for the corresponding focus state in an image database; and
   performing a 3D reconstruction of the object from the first image data and the first camera intrinsic parameter values for the corresponding focus states for the first image data stored in the image database.

6. The method of claim 5, wherein determining the first camera-to-object distance comprises:

determining a first sensor-to-object distance from a distance sensor to the object, wherein the distance sensor has a fixed spatial relationship with the camera; and determining the first camera-to-object distance from the camera to the object based on the first sensor-to-object distance.

7. The method of claim 5, wherein causing the camera controller to adjust the camera focus state comprises:

retrieving a first camera lens actuator setting for a camera lens actuator of the camera, wherein the first camera lens actuator setting corresponds to the first camera focus state; and causing the camera lens actuator to displace to the first camera lens actuator setting to adjust the camera to the first camera focus state.

8. The method of claim 5, wherein storing the first image data comprises storing the first image data and the first camera intrinsic parameter values in the image database with additional images of the object and corresponding camera intrinsic parameter values taken from multiple camera positions relative to the object.

9. The method of claim 5, comprising performing the determining, causing, retrieving, commanding and storing steps at each of a plurality of camera positions relative to the object.

* * * * *